United States Patent
Herle et al.

(10) Patent No.: US 7,289,521 B2
(45) Date of Patent: Oct. 30, 2007

(54) INTELLIGENT IP RELAY

(75) Inventors: Sudhindra Pundaleeka Herle, Plano, TX (US); Bryan Jeffery Moles, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 883 days.

(21) Appl. No.: 09/930,665

(22) Filed: Aug. 15, 2001

(65) Prior Publication Data

US 2003/0035413 A1   Feb. 20, 2003

(51) Int. Cl.
*H04L 12/28*   (2006.01)
(52) U.S. Cl. .................. 370/401; 370/468; 370/474; 370/338; 455/11.1
(58) Field of Classification Search ............. 370/310, 370/315, 464, 465, 466, 468, 473, 474, 477
See application file for complete search history.

(56) References Cited

U.S. PATENT DOCUMENTS

| | | | |
|---|---|---|---|
| 6,091,733 A * | 7/2000 | Takagi et al. .............. | 370/401 |
| 6,212,190 B1 * | 4/2001 | Mulligan .................... | 370/400 |
| 6,272,148 B1 * | 8/2001 | Takagi et al. .............. | 370/469 |
| 6,564,267 B1 * | 5/2003 | Lindsay ...................... | 709/250 |
| 6,721,334 B1 * | 4/2004 | Ketcham .................... | 370/473 |
| 6,728,365 B1 * | 4/2004 | Li et al. ..................... | 379/329 |

OTHER PUBLICATIONS

Lettieri et al. "Adaptive Frame Length Control for Improving Wireless Link Throughput, Range, and Energy Efficiency". IEEE. Mar. 29-Apr. 2, 1998. pp. 564-571.*

* cited by examiner

*Primary Examiner*—Duc Ho

(57) ABSTRACT

A proxy at the interface between a wireless communications system and a packet network intercepts all traffic between the wireless communications systems and the packet network and re-formats the intercepted traffic according to an optimal maximum transmission unit size between the interception point and the final destination, excluding the wireless link from computation of the optimal maximum transmission unit size. Typically this will result in packets from the wireless communications system being aggregated into a larger maximum transmission unit size, while packets from the packet network are fragmented into a smaller maximum transmission unit size. Congestion at intermediate nodes within the packet network is reduced, while end-to-end bandwidth utilization and latency at the final destination are improved.

18 Claims, 2 Drawing Sheets

INTELLIGENT IP RELAY

TECHNICAL FIELD OF THE INVENTION

The present invention is directed, in general, to wireless communications interfaces to packet networks and, more specifically, to optimizing packet sizes for wireless communications with a packet network node.

BACKGROUND OF THE INVENTION

Current implementations of the transmission control protocol/Internet protocol (TCP/IP) network standard within wireless environments run with certain configurations of variables relating to the transmission control protocol (TCP) portion of the standard such as timeouts, window sizes, window scale, and the like. Optimization of such transmission control protocol variables, however, does little to benefit other protocols running on top of the Internet protocol (IP) layer, such as real-time transport protocol (RTP).

Moreover, wireless links often employ a maximum transmision unit (MTU) which is smaller than those employed for hard-wired or land line network connections since radio frequency (RF) transmission is lossy, more prone to corruption and dropouts. For example, wireless links typically employ a maximum transmission unit size of between about 128 and 300 bytes, while land line (Ethernet) networks employ an average maximum transmission unit size of about 1,500 bytes, and may employ a maximum transmission unit size of up to 8 kilobytes (KB). However, the maximum transmission unit size for data streams including a wireless link is usually set to the smaller size throughout the entire communications path.

A small maximum transmission unit or packet size implies lower effective end-to-end bandwidth utilization for the data stream. Smaller packets also tend to congest the network hosts and all intermediate routers, and the destination host incurs higher processor utilization to process (more numerous) smaller Internet protocol packets.

When implementations of the Internet Protocol Version 6 (IPv6) network standard, which are currently being incrementally deployed, become ubiquitous, intermediate nodes in a network will NOT perform fragmentation and re-assembly of large packets into smaller packets and vice versa. All hosts connected to such an IPv6 network will therefore be required to implement "path maximum transmission unit discovery" to identify (and employ) the maximum transmission unit size which the desired data stream path is capable of sustaining. For systems with a wireless link, this requirement will lead to lower effective bandwidth utilization and other problems as described above.

There is, therefore, a need in the art for a system of intelligent Internet protocol packet relay for data streams including a wireless link.

SUMMARY OF THE INVENTION

To address the above-discussed deficiencies of the prior art, it is a primary object of the present invention to provide, for use in a communications path including a wireless link to a packet network not having packet aggregation and fragmentation at intermediate nodes therein, a proxy at the interface between a wireless communications system and a packet network that intercepts all traffic between the wireless communications systems and the packet network and re-formats the intercepted traffic according to an optimal maximum transmission unit size between the interception point and the final destination, excluding the wireless link from computation of the optimal path maximum transmission unit size. Typically this will result in packets from the wireless communications system being aggregated into a larger maximum transmission unit size, while packets from the packet network are fragmented into a smaller maximum transmission unit size. Congestion at intermediate nodes within the packet network is reduced, while end-to-end bandwidth utilization and latency at the final destination are improved.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
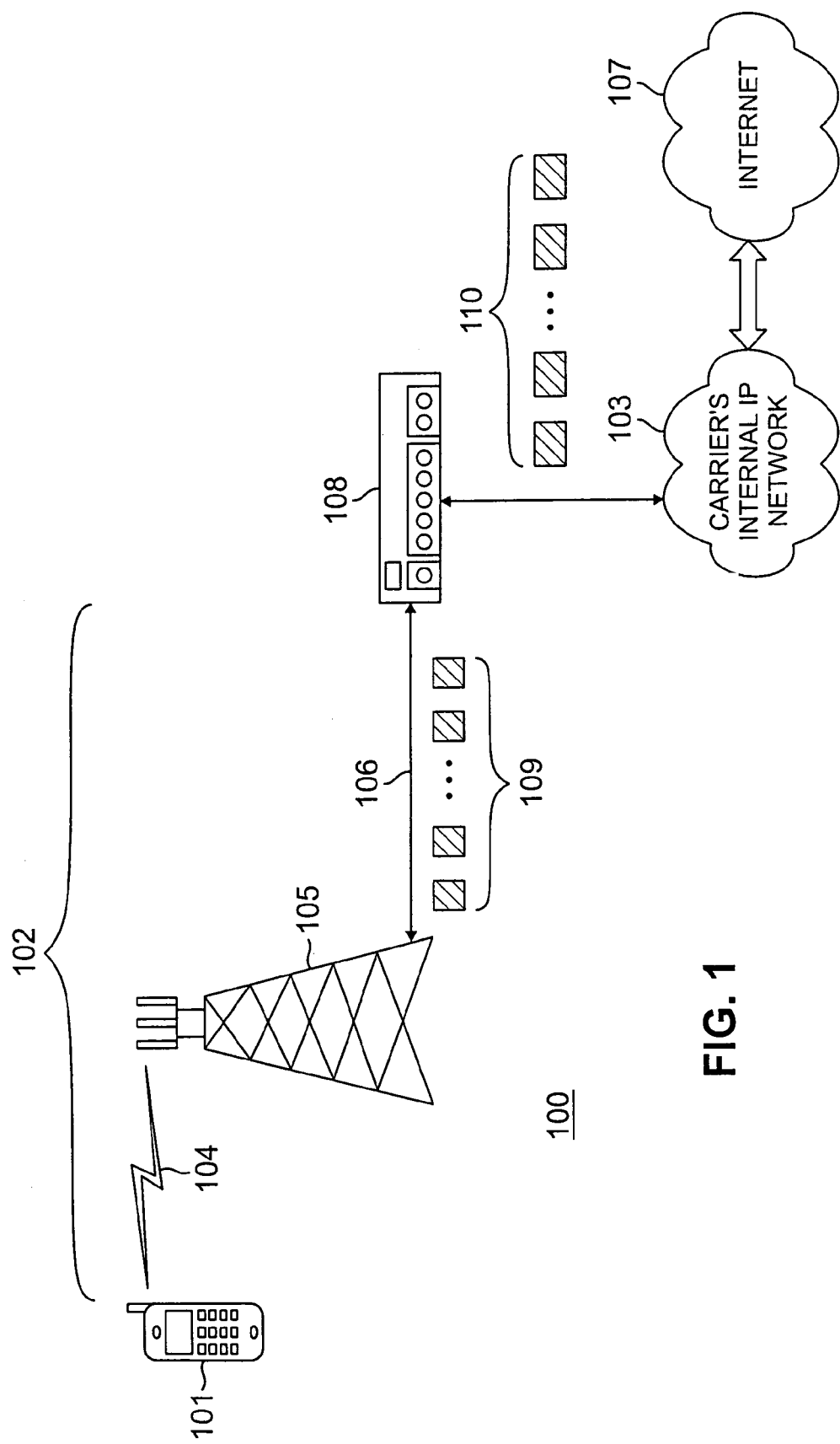
FIG. 1 depicts a communications system including a wireless link to a packet network according to one embodiment of the present invention.
Figure 2:
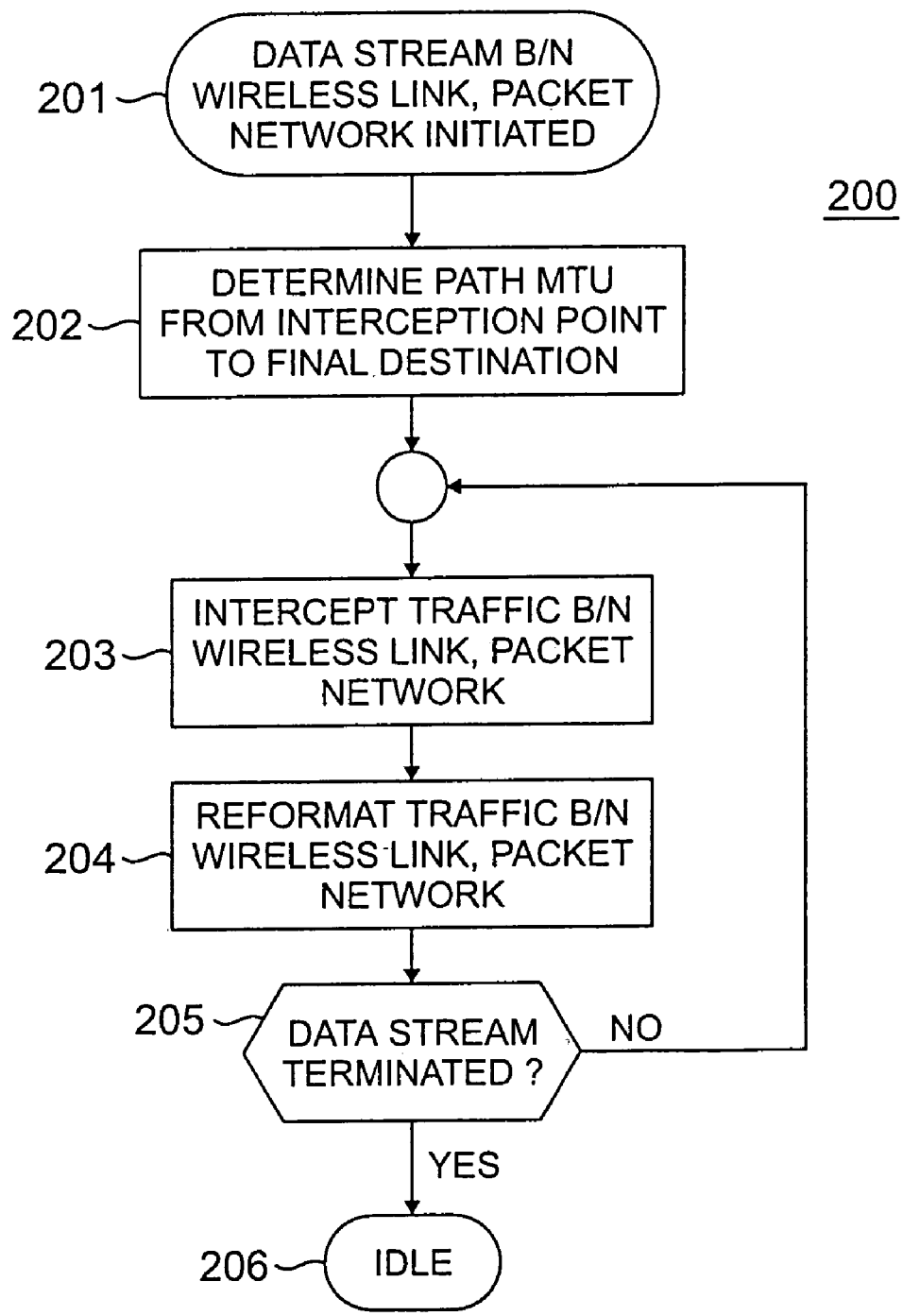
FIG. 2 depicts a high level flowchart for a process of handling traffic between a wireless link and a packet network according to one embodiment of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a communications system including a wireless link to a packet network according to one embodiment of the present invention. Communications system 100 includes a remote station 101 (e.g., a mobile telephone, a wireless personal digital assistant (PDA), or the like) coupled by a wireless communications link 102 to a packet network 103, which is an Internet protocol packet network in the exemplary embodiment. Wireless link 102 includes a wireless communications channel 104 from remote station 101 to a base station 105 and a land line connection 106 from the base station (through a mobile switching center or the like) to the packet network 103, and may employ any suitable wireless communications standard permitting communications with a packet network such as code division multiple access (CDMA).

Packet network 103 in the exemplary embodiment is an internal network for a wireless communications carrier enterprise, and includes a connection to the Internet 107. The communications path between remote station 101 and the destination (or source, for downstream data traffic) includes wireless link 102 and terminates at the destination, which will typically be within the Internet 107 but may alternatively be within internal carrier packet network 103.

In the present invention, the communications path between remote station 101 and the destination (which is either within internal carrier packet network 103 or is reached through internal carrier packet network 103) includes a packet relay controller 108 between the wireless link 102 and the remainder of the communications path. Packet relay controller 108, an Internet protocol packet relay in the exemplary embodiment, preferably consists of an Internet protocol level proxy which intercepts all wireless Internet protocol traffic between the mobile station 101 and the packet network 103.

Packet relay controller 108 receives packets 109 from wireless link 102 having a small maximum transmission unit size suitable for wireless communications and assembles the received packets 109 into packets 110 having a larger, optimal maximum transmission unit size. The optimal maximum transmission unit size is ascertained by path maximum transmission unit discovery between packet relay controller 108 and the final destination. Likewise, packet relay controller 108 fragments packets 110 received from the packet network 103 having the larger maximum transmission unit size into smaller packets 109 having the maximum transmission unit size suitable for wireless link 102 prior to forwarding the packets over wireless link 102.

In one sense, the packet relay controller 108 simply aggregates all Internet protocol flows from remote station 101 by re-computing the path maximum transmission unit after the first hop, the wireless link 102. By intercepting traffic for aggregation or fragmentation, packet relay controller 108 reduces congestion in the intermediate nodes within internal carrier packet network 103 and Internet 107 while improving end-to-end bandwidth utilization for the mobile station 101 and reducing latency at the destination server (by reducing the required processing).

Packet relay controller 108 may be implemented within a base transmitter station (BTS) or a base switching center (BSC) for the carrier's wireless network, or within an inter-working function (IWF) module—the hardware and software which enable transmission of combined voice and data over a packet network—within the carrier's wireless network, which is typically at the interface between the carrier's wireless network and the carrier's internal packet network 103. Having a proxy level packet relay controller 108 within the inter-working function would be preferable for a service provider (carrier) since such an implementation results in fewer physical devices which need to be managed.

FIG. 2 depicts a high level flowchart for a process of handling traffic between a wireless link and a packet network according to one embodiment of the present invention. The process 200 begins with detection of communications (e.g., a data stream) being initiated from a wireless link over a packet network (step 201). The path maximum transmission unit between an interception point—preferably at a point within the communications path close to the wireless link and having a land line connection to the packet network—and the final destination within the packet network is discovered (step 202), and all traffic between the wireless link and the packet network is intercepted (step 203).

All intercepted traffic from the wireless link is reformatted to employ the maximum transmission unit size for the portion of the communications path between the interception point and the final destination, while all intercepted traffic to the wireless link is re-formatted to employ the maximum transmission unit size suitable for the wireless link (step 204). The interception and reformatting of traffic continues until termination of the data stream is detected (step 205), at which time the process becomes idle (step 206) until another data stream between the wireless link and the packet network is initiated.

As Internet protocol services are increasingly deployed for wireless communications systems, performance and bandwidth become a critical issue. The present invention improves performance and bandwidth utilization in communications between a wireless device and a packet network server. Currently proposed optimizations for Internet protocol implementations in wireless environments have not included the method of the present invention.

It is important to note that while the present invention has been described in the context of a fully functional network device, those skilled in the art will appreciate that the mechanism of the present invention is capable of being implemented and distributed in the form of a computer usable medium of instructions in a variety of forms, and that the present invention applies equally regardless of the particular type of signal bearing medium used to carry out the distribution. Examples include, but are not limited to: non-volatile, hard-coded or programmable type mediums such as read only memories (ROMs) or erasable, electrically programmable read only memories (EEPROMs), recordable type mediums such as floppy disks, hard disk drives, and read/write (R/W) compact disc read only memories (CD-ROMs) or digital versatile discs (DVDs), and transmission type mediums such as digital and analog communications links.

Although the present invention has been described in detail, those skilled in the art will understand that various changes, substitutions, and alterations herein may be made without departing from the spirit and scope of the invention it its broadest form.

What is claimed is:

1. For use in communications system coupled to a packet network, a packet relay for improving bandwidth utilization comprising:
   a connection to a wireless link;
   a connection to the packet network, wherein the packet network lacks packet aggregation and fragmentation at intermediate nodes therein; and a packet relay controller intercepting traffic between the wireless link and the packet network and re-formatting the intercepted traffic to employ a first maximum transmission unit size for intercepted traffic forwarded to the packet network and a second maximum transmission unit size for intercepted traffic forwarded to the wireless link, wherein the first maximum transmission unit size is larger than the second maximum transmission unit size.

2. The packet relay as set forth in claim 1 wherein the first maximum transmission unit size is an optimal path maximum transmission unit size for packet communications between the packet relay controller and a final destination within the packet network.

3. The packet relay as set forth in claim 1 wherein the second maximum transmission unit size is suitable for wireless communications.

4. The packet relay as set forth in claim 1 wherein the packet relay controller aggregates packets within intercepted traffic from the wireless link for forwarding to the packet network.

5. The packet relay as set forth in claim 1 wherein the packet relay controller fragments packets within intercepted traffic from the packet network for forwarding to the wireless link.

6. The packet relay as set forth in claim 1 wherein the packet relay controller is an Internet protocol level proxy within an interface between a wireless communications system and an internal packet network for an enterprise operating the wireless communications system.

7. A communications system comprising: a wireless communications device employing a wireless link;
a packet network lacking packet aggregation and fragmentation at intermediate nodes therein; and
a packet relay for improving bandwidth utilization in communications between the wireless communications device and a final destination within the packet network comprising:
a connection to the wireless link;
a connection to the packet network; and
a packet relay controller intercepting traffic between the wireless link and the packet network and re-formatting the intercepted traffic to employ a first maximum transmission unit size for intercepted traffic forwarded to the packet network and a second maximum transmission unit size for intercepted traffic forwarded to the wireless link,
wherein the second maximum transmission unit size is smaller than the first maximum transmission unit size.

8. The communications system as set forth in claim 7 wherein the first maximum transmission unit size is an optimal path maximum transmission unit size for packet communications between the packet relay controller and a final destination within the packet network.

9. The communications system as set forth in claim 7 wherein the second maximum transmission unit size is suitable for wireless communications.

10. The communications system as set forth in claim 7 wherein the packet relay controller aggregates packets within intercepted traffic from the wireless link for forwarding to the packet network.

11. The communications system as set forth in claim 7 wherein the packet relay controller fragments packets within intercepted traffic from the packet network for forwarding to the wireless link.

12. The communications system as set forth in claim 7 wherein the packet relay controller is an Internet protocol level proxy within an interface between a wireless communications system and an internal packet network for an enterprise operating the wireless communications system.

13. For use in communications system coupled to a packet network, a method of improving bandwidth utilization comprising:
intercepting traffic from a wireless link to the packet network, wherein the packet network lacks packet aggregation and fragmentation at intermediate nodes therein;
re-formatting the intercepted traffic to employ a first maximum transmission unit size different than a second maximum transmission unit size of the intercepted traffic;
forwarding the re-formatted traffic to the packet network;
intercepting traffic from the packet network to the wireless link; and
re-formatting the intercepted traffic from the packet network to the wireless link to employ the second maximum transmission unit size.

14. The method as set forth in claim 13 wherein the step of re-formatting the intercepted traffic to employ a first maximum transmission unit size different than a second maximum transmission unit size of the intercepted traffic further comprises:
re-formatting the intercepted traffic to employ a maximum transmission unit size which is larger than the second maximum transmission unit size.

15. The method as set forth in claim 13 wherein the step of re-formatting the intercepted traffic to employ a first maximum transmission unit size different than a second maximum transmission unit size of the intercepted traffic further comprises:
re-formatting the intercepted traffic to employ an optimal path maximum transmission unit size for packet communications between an interception point and a final destination within the packet network.

16. The method as set forth in claim 13 wherein the step of re-formatting the intercepted traffic to employ a first maximum transmission unit size different than a second maximum transmission unit size of the intercepted traffic further comprises:
re-formatting the intercepted traffic from a maximum transmission unit size suitable for wireless communications.

17. The method as set forth in claim 13 wherein the step of re-formatting the
intercepted traffic to employ a first maximum transmission unit size different than a second maximum transmission unit size of the intercepted traffic further comprises:
aggregating packets within intercepted traffic from the wireless link for forwarding to the packet network.

18. The method as set forth in claim 13 further comprising: forwarding the intercepted traffic re-formatted to employ the second maximum transmission unit size to the wireless link.

* * * * *